(No Model.)  
2 Sheets—Sheet 1.
G. G. PRENTICE.
TYPE WRITING MACHINE.
No. 456,339. Patented July 21, 1891.
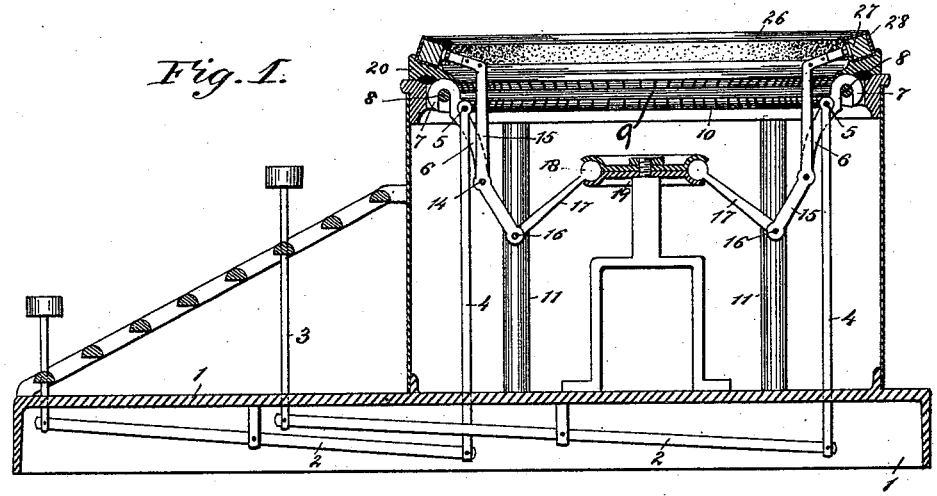
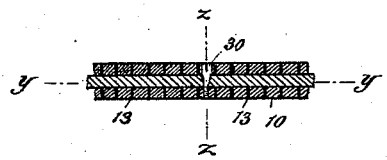
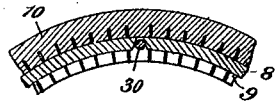
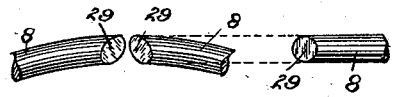
Attest:  
Andrew W. Steiger  
Lillie Browning
Inventor:  
George G. Prentice  
By Jacob Felbel  
Atty.

(No Model.) 2 Sheets—Sheet 2.
G. G. PRENTICE.
TYPE WRITING MACHINE.
No. 456,339. Patented July 21, 1891.
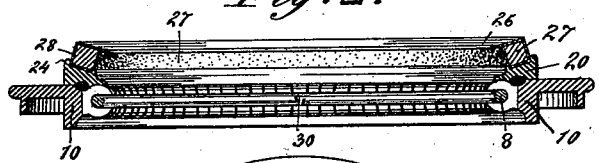
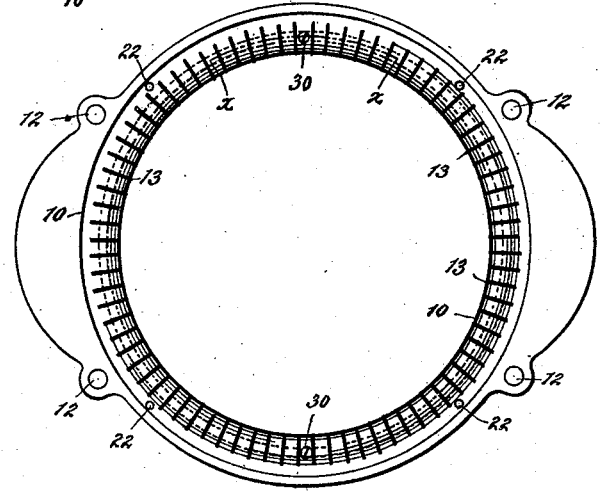
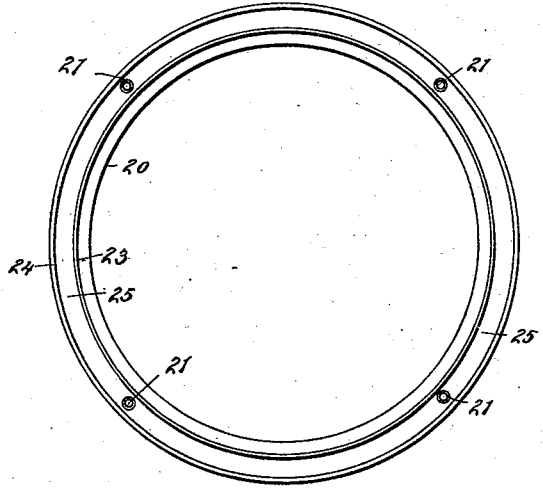
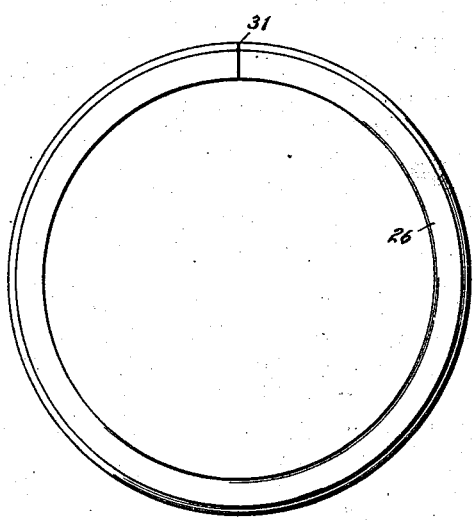
Attest:
Andrew O. Steiger
Lillie Browning
Inventor:
George G. Prentice
By Jacob Felbel
Att'y

UNITED STATES PATENT OFFICE.

GEORGE G. PRENTICE, OF BRIDGEPORT, CONNECTICUT, ASSIGNOR TO THE DAVIDSON WRITING MACHINE COMPANY, OF NEW YORK, N. Y.

TYPE-WRITING MACHINE.

SPECIFICATION forming part of Letters Patent No. 456,339, dated July 21, 1891.

Application filed January 9, 1891. Serial No. 377,248. (No model.)

*To all whom it may concern:*

Be it known that I, GEORGE G. PRENTICE, a citizen of the United States, and a resident of Bridgeport, in the county of Fairfield and State of Connecticut, have invented certain new and useful Improvements in Type-Writing Machines, of which the following is a specification.

My improvements relate more particularly to what is known as the "Yost" type-writing machine; but some of them may, however, be embodied in machines of different construction.

My invention has for its main object to provide for holding levers or type-bars in position, and also for supporting and holding in position an inking-pad; and to these ends my invention consists in the features of construction and combinations of devices hereinafter more fully described, and particularly pointed out in the appended claims.

In the accompanying drawings, Figure 1 is a central longitudinal section of a type-writing machine embodying my improvements. Fig. 2 is a similar transverse section of the upper part of the machine, showing a top plate, fulcrum-ring, cover-plate, and inking-pad. Fig. 3 is a plan view of the top plate or type-ring. Fig. 4 is a top plan view of the cover-plate or ring. Fig. 5 is a top plan view of the inking-pad holder or case. Fig. 6 is a vertical section of a portion of the type-ring, taken at the line $x\,x$ of Fig. 3. Fig. 7 is a horizontal section taken at the line $y\,y$ of Fig. 6. Fig. 8 is a vertical section taken at the line $z\,z$ of Fig. 6. Fig. 9 is a top plan view of the ends of the fulcrum-ring, one of the ends being projected and shown in face view.

In the several views the same part will be found designated by the same numeral of reference.

1 is the base plate or bed of the machine, beneath which are arranged key-levers 2, having each at its forward end a finger-key 3 and at its rear end a connecting-rod 4, which latter at its upper end is pivoted at 5 to a lever 6, forming part of the type-movement and having a hook-shaped upper end 7, which is fulcrumed upon a wire ring 8, which is seated in a horizontal groove 9, formed in a top plate or type-ring 10, which is supported at the upper part of the machine by means of posts 11, rising from the bed-plate and connected to the type-ring at the localities marked 12. The type-ring or top plate is provided with a series of radial slits or slots 13, in which lie the upper hooked end 7 of the levers 6. To the lower end of the lever 6 is pivoted at 14 a type-bar 15, which at 16 is also pivoted to the lower end of a link 17, fulcrumed at 18 in a stand or bracket 19, secured to the bed-plate. In order to prevent the levers 6 from being unhooked from the fulcrum-ring or from rising from said ring when the connecting-rods 4 are pushed up, a cover-plate or holding-ring 20 is provided, which, by screws, preferably, is attached to the top plate or type-ring, holes 21 in the cover or clamping-plate and registering-holes 22 in the type-ring being provided for said screws.

The top surface of the cover or clamping ring 20 is provided with two circular beads or ribs 23 and 24, forming between them a circular seat or recess 25, within which is fitted an inking-pad holder or case 26, containing an inking-pad 27 of felt or other suitable material. The inking-pad case or holder is preferably made three-sided, the outer wall or rim 28 being inclined, and the inner face or periphery of the rib 24 is made inclined to match the inclination of the wall or rim 28 for the purpose of preventing effectually any casual slipping off or derangement of the inking-pad. While I prefer to use also the rim 23, it is not essential.

In order to have the round wire fulcrum-ring 8 fit perfectly within the circular groove 9, formed in the top plate or type-ring, I make said fulcrum-ring preferably in sections or of two substantially semicircular parts, and bevel or chamfer their ends, as indicated at 29. These circular pieces or sections are inserted into the groove in the top plate with their ends abutting, and are then forced to a perfect seat or bearing or snug circular fit within said groove by means of adjusting-screws 30, engaging with the type-ring, as more clearly shown in Figs. 3, 6, 7, and 8. Each of said screws between its head and threaded point is made conical or tapering or wedge-like to match the taper or bevel of the ends of the fulcrum-ring 29, so that when said screws are turned down they operate to force or wedge apart or slightly separate the semicircular portions of the fulcrum-ring and cause them to fit snugly within or take a perfect bearing all around the groove 8, formed in the type-ring, and by means of these screws the adjustment of the fulcrum-ring may be made so fine or exact as that every point of said ring as a whole may be the same distance from the center, or, in other words, be caused to assume a perfect circle or ring.

By beveling the ends of the two-part fulcrum-ring, as shown, and by using the conical screws, not only is the adjustment described obtained, but said two-part ring is securely locked in position and prevented from falling out of the groove or becoming in any manner accidentally disarranged.

The inking-pad holder may be split through at the locality marked 31, or may be made in two parts or halves, as may be desired, to facilitate the placing of said inking-pad holder in position upon the cover or clamping ring. In practice I have made them both ways, as well as in a continuous unbroken ring. As the Yost machine is now constructed, it is necessary to have a ring severed at the point 31 or made in two parts to embrace or pass around the connecting-rod, which operates the letter-space-feeding devices.

The inking-pad holder is made to have a close fit in the groove or seat 25, and is preferably snapped or sprung into place after the type-bars have all been bunched or drawn to the center of the machine. When the pad has been arranged in position, the type ends of the type-bars all stand against the inner surface of the same, as shown at Fig. 1.

Some of my improvements may be used without others, and certain changes in detail construction of the type movement may be made without departing from the spirit of my invention.

What I claim as new, and desire to secure by Letters Patent, is—

1. In a type-writing machine, the combination, with a top plate or type-ring having a circular groove and slitted radially, of a fulcrum-ring arranged within said groove, a series of type-levers hooked over said fulcrum-ring, a cover-plate or clamping-ring for holding said levers in position, an inking-pad mounted on said cover-plate or clamping-ring, and a series of type-carriers pivoted to said levers and having their type ends resting against said pad, substantially as set forth.

2. In a type-writing machine, the combination, with the top plate or type-ring having a circular groove and slitted radially, of a fulcrum-ring within said groove made in detached parts or sections, and means for adjusting said parts within said groove, substantially as set forth.

3. In a type-writing-machine, the combination, with a top plate or type-ring having a circular groove and slitted radially, of a fulcrum-ring made in parts or sections with beveled ends, and wedges for adjusting said parts within said groove, substantially as set forth.

4. In a type-writing machine, the combination, with a top plate or type-ring having a circular groove and slitted radially, of a fulcrum-ring arranged within said groove made in two parts with beveled ends, and beveled or tapering screws for adjusting said parts within said groove, substantially as set forth.

5. In a type-writing machine, the combination, with a top plate or type-ring slitted radially and having a circular groove, of a two-part fulcrum-ring having beveled ends, beveled or tapering adjusting-screws therefor, a series of type-levers hooked over said ring, and a cover-plate or clamping-ring secured to said type-ring, substantially as set forth.

6. In a type-writing-machine, the combination, with a top plate or type-ring slitted radially and having a circular groove, of a two-part fulcrum-ring having beveled ends, beveled or tapering screws for adjusting the same, a series of type-levers hooked over the said fulcrum-ring, a cover-plate or clamping-ring arranged over said levers, an inking-pad holder or case mounted on said cover-plate or clamping-ring and containing an inking-pad, and a series of type-bars connected to said type-levers and having their type ends resting against said pad, substantially as set forth.

7. In a type-writing machine, the combination, with a top plate or type-ring slitted radially and having a circular groove, of a fulcrum-ring, a series of levers fulcrumed on said ring, a cover-plate having a beveled circular rib, as 24, a circular inking-pad holder having an inclined back and containing an inking-pad, and a series of type-bars connected to said levers and having their type ends resting against said pad, substantially as set forth.

8. In a type-writing machine, the combination, with a top plate or type-ring slitted radially and having a circular groove, of a two-part fulcrum-ring having beveled ends and adjusting-screws, a series of levers hooked over said fulcrum-ring, a series of type-bars connected each at one point to one of said levers and at another point to one of a series of pivoted links, a clamping-plate arranged above said levers, and an inking-pad within a holder mounted upon said clamping-plate, against which the type ends of said type-bars normally rest, and means, substantially as described, for actuating the type-movement, substantially as set forth.

Signed at Bridgeport, in the county of Fairfield and State of Connecticut, this 7th day of January, A. D. 1891.

GEORGE G. PRENTICE.

Witnesses:
CHARLES SHERWOOD,
W. W. TOTMAN.